United States Patent [19]

Larson

[11] 4,328,193
[45] May 4, 1982

[54] PROCESS FOR REMOVING RADIUM FROM MONOCALCIUM PHOSPHATE SOLUTIONS BY CENTRIFUGATION

[75] Inventor: Harold V. Larson, Houston, Tex.

[73] Assignees: Olin Corporation, New Haven, Conn.; United States Gypsum Company, Chicago, Ill.

[21] Appl. No.: 125,300

[22] Filed: Feb. 27, 1980

[51] Int. Cl.³ .............. C01F 11/46; C01F 13/00; C01B 25/16
[52] U.S. Cl. .................... 423/166; 423/2; 423/167; 423/249; 423/319; 423/321 R; 423/555
[58] Field of Search .......... 423/162, 166, 167, 170, 423/171, 172, 555, 319, 321 R, 2, 249, 308, 309

[56] References Cited

U.S. PATENT DOCUMENTS

| | | | |
|---|---|---|---|
| 1,894,514 | 1/1933 | Hechenbleikner | 423/166 |
| 2,531,977 | 11/1950 | Hammaren et al. | 423/167 |
| 2,567,227 | 9/1951 | Miller | 423/166 |
| 3,003,852 | 10/1961 | Nordongren | 423/319 |
| 3,418,077 | 12/1968 | Robinson | 423/319 |
| 3,792,151 | 2/1974 | Case | 423/166 |
| 3,840,639 | 10/1974 | Drechsel | 423/167 |
| 3,919,395 | 11/1975 | Hauge | 423/309 |
| 3,949,047 | 4/1976 | Cherdron et al. | 423/167 |
| 3,951,675 | 4/1976 | Krempff | 423/166 |
| 4,029,743 | 6/1977 | Hauge | 423/167 |
| 4,146,568 | 3/1979 | Lange, Jr. | 423/555 |
| 4,222,990 | 9/1980 | Drechsel | 423/309 |

FOREIGN PATENT DOCUMENTS 1113922 5/1968 United Kingdom .............. 423/312

OTHER PUBLICATIONS

Sneed et al., Comprehensive Inorganic Chemistry, D. Van Nostrand Co., Inc, NY, NY, 1953 pp. 131-132.
Kirk et al., Encyclopedia of Chemical Technology, 1st Edition vol. 11, The Interscience Encyclopedia Co. Inc. NY, NY p. 469.

Primary Examiner—Gary P. Straub
Attorney, Agent, or Firm—William A. Simons; Thomas P. O'Day

[57] ABSTRACT

Disclosed is a method for treating substantially homogeneous monocalcium phosphate (MCP) solutions that contain undesirable amounts of radium which comprises centrifuging these MCP solutions sufficiently to separate at least a portion of the radium from the solution. Such treated MCP solutions may then be reacted with sulfuric acid to simultaneously produce a phosphoric acid solution and a calcium sulfate precipitate such as gypsum having low levels of radium content.

3 Claims, 1 Drawing Figure

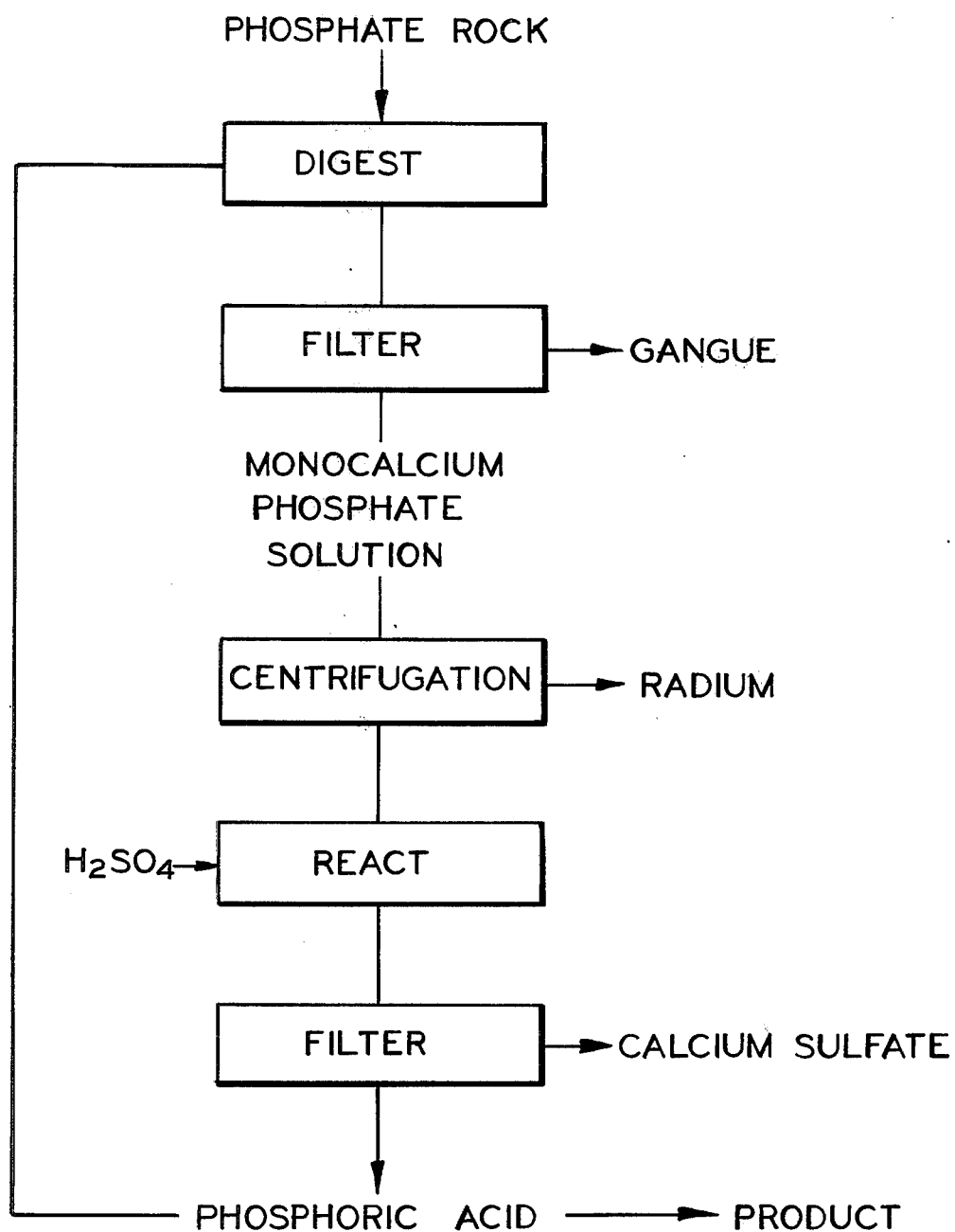

PROCESS FOR REMOVING RADIUM FROM MONOCALCIUM PHOSPHATE SOLUTIONS BY CENTRIFUGATION

BACKGROUND OF THE INVENTION

1. Field of the Invention

The present invention relates to a process for separating radium from monocalcium phosphate solutions. More particularly, the present invention relates to a process for separating radium from monocalcium phosphate solutions by a centrifugation step.

2. Description of the Prior Art

Numerous prior art references describe many different wet processes for simultaneously producing both phosphoric acid solutions and calcium sulfate products (either the anhydrite form—$CaSO_4$ with no water of hydration; the hemihydrate form—$CaSO_4.\frac{1}{2}H_2O$; or the dihydrate form or gypsum—$CaSO_4.2H_2O$). One generally disclosed type of process is to, first, digest phosphate rock with either recycled phosphoric acid, a recycled monocalcium phosphate (MCP) solution, or mixtures of both in order to form a monocalcium phosphate solution containing undigested gangue material (impurities such as Fe, Al, F and Si); second, separating the gangue from the MCP solution; third, reacting the clarified solution with sulfuric acid to simultaneously form a phosphoric acid solution and a solid calcium sulfate product; and, fourth, separating the phosphoric acid solution from the calcium sulfate product. As examples of this general type of process, see U.S. Pat. Nos. 2,531,977; 3,003,852; 3,418,077; 3,792,151; 3,840,639; 3,949,047 and 4,029,743. The milder rock digestion with $H_3PO_4$ or MCP solution (rather than $H_2SO_4$) allows for a relatively large portion of the undesirable impurities in the phosphate rock like Fe, Al, F and Si to be easily removed in the gangue.

However, the prior art references mentioned above were not generally concerned with the presence of radioactive impurities such as radium in the phosphate rock and usually did not teach any specific steps for their removal. Only U.S. Pat. No. 3,949,047, which issued to Cherdron et al. on Apr. 6, 1976, specifically teaches a method for removing radium contaminants from a monocalcium phosphate solution. That method includes the addition of a soluble barium compound in the presence of sulfate ions to precipitate radium ions as radium sulfate. However, the use of barium compounds in large-scale commercial phosphoric acid plants seems prohibited by their relatively high cost.

The radium originating from the phosphate rock, if not removed, will usually end up in the calcium sulfate products (e.g., gypsum) made by the above-mentioned processes. In the past, these calcium sulfate products were generally discarded as unwanted by-products because of the presence of the impurities contained therein. Large piles of this material can be found at some phosphoric acid plants. Moreover, the presence of the radium in these calcium sulfate wastes has increasingly become the concern of governmental regulatory agencies and the industry itself. It is possible that these calcium sulfate wastes may become classified as hazardous materials if they have too high radium content. Furthermore, the radium imparts a slight radioactivity to these calcium sulfate products which poses a possible obstacle to their use in construction items such as wallboard, even when the radioactivity levels are minute.

Accordingly, there is a need in the art for an effective and economic means for removing at least a portion of the radium that originates in phosphate rock. Furthermore, there is a need in the art for making calcium sulfate products which have acceptable levels of radium so they may be utilized in construction items. The process of the present invention offers a solution to those needs.

BRIEF SUMMARY OF THE INVENTION

The present invention is, therefore, directed to a process for removing at least a portion of the radium contained in a substantially homogeneous monocalcium phosphate (MCP) solution made from radium-containing phosphate rock. This process comprises subjecting this MCP solution to sufficient centrifugation in order to separate at least a portion of the radium-containing contaminants from MCP solution.

This treated MCP solution can be then reacted with sulfuric acid to produce a phosphoric acid solution and a calcium sulfate product having low levels of radium content which may be useful for making building items such as wallboard.

BRIEF DESCRIPTION OF THE DRAWING

The FIGURE is a diagrammatic flow chart illustrating one preferred method of the present invention.

DETAILED DESCRIPTION

The process of the present invention is based on the theory that radium impurities in MCP solutions, if untreated, act as small particles rather than dissolved ions in solution. This theory has support in previous observations that other radioisotopes (e.g., Pb and Bi) sometimes have this "radiocolloid behavoir" in other solutions (unrelated to MCP solutions). See Kirk and Othmer, *Encyclopedia of Chemical Technology*, (First Edition, Vol. 11, page 469) and Sneed, Maynard and Bradsted, *Comprehensive Inorganic Chemistry*, (pages 131–132).

As part of this invention, it was found that these radium radiocolloids or small particles could be thrown down (i.e., out) or separated by centrifuging action, and thus removed from the MCP solution. The treated MCP solution can then be used to form calcium sulfate products and phosphoric acids, or other useful products.

The term "monocalcium phosphate solution" as employed herein refers to any conventionally employed MCP solution from which phosphoric acid and calcium sulfate products can be made. The MCP solutions covered herein are not limited to any particular CaO or $P_2O_5$ levels and such parameters are not critical limitations of the present invention. This term also includes any or all mixtures of MCP and phosphoric acid, as commonly used in the phosphoric acid art.

The term "substantially homogeneous" as employed herein as an adjective to MCP solutions refers to these solutions which have had the gangue and other insoluble material substantially removed (i.e., over about 95% by weight, preferably at least about 98% by weight, insolubles removed). In particular, these above two defined terms refer to any substantially homogeneous MCP solutions which are made by digesting radium-containing phosphate rock with a solution comprising phosphoric acid, monocalcium phosphates or mixtures thereof and then removing the insoluble material therefrom. The present invention is not limited to any particular process limitations for making such substantially homogeneous solutions and any and all conventionally employed process parameters may be used.

The term "sufficient centrifugation" as employed herein refers to any suitable centrifugation operation which is carried on long enough and at high enough speeds to throw out or separate at least a portion of the radium from the MCP solution. Preferably, this centrifugation operation is carried on to remove at least a major portion (i.e., over about 50% by weight) of the radium from the MCP solution. Most preferably, the centrifugation operation is carried on enough so that any calcium sulfate product made from that MCP will contain less than about 5 pCi/gm of radium.

The term "centrifugation" herein also refers to the total operation of throwing down or separating the radium particles by centrifugal force and also physically removing those particles from the MCP solution. In some commercial centrifuges, these steps of throwing down the particles and removing them from the solution occur simultaneously. In other commercial centrifuges, these steps occur in sequence. The present invention intends to cover both operations. In all, any suitable centrifuge apparatus including any suitable settling-type centrifuge or any centrifugal filter or combination of the two may be used. Of course, the time of centrifuging and speed of the centrifuge necessary for the present invention would greatly depend upon the particular apparatus employed. A person having ordinary skill in the centrifuge art would be able to select the optimum speed and time for this operation, depending upon what centrifuge apparatus is selected.

Referring to the preferred process shown by the FIGURE, phosphate rock is first introduced into a digester wherein the rock is dissolved in an excess of phosphoric acid to form a monocalcium phosphate solution and insoluble gangue material. Alternatively, recycled monocalcium phosphate may be used instead of or in combination with the phosphoric acid to digest the rock. Any conventional or known means is used for digesting rock into a MCP solution.

Any radium-containing and calcium-containing phosphate rock such as Florida phosphate rock which is conventionally used to make wet process phosphoric acid may be utilized herein. The rock may have any particle size, and $P_2O_5$ content, and any other mineral and any impurities which have conventionally been acceptable for this type of process. The only parameter of the rock which is considered applicable to the present invention is that it should contain a level of radium impurities therein which may make the calcium sulfate products made from it have unacceptable high radium concentrations.

After the digestion step, the effluent of the digester is then passed to a classifier or filter where substantially all of the gangue and other insoluble material is separated from the monocalcium phosphate solution. Instead of a classifier or filter, any suitable separating device may be used for this purpose. But, it should be noted that conventional gangue separation steps (e.g., coarse filtration) used in large-scale wet process phosphoric acid plants will not remove substantial amounts of small radium particles or radiocolloids from the MCP solution. After separation, the gangue may be water-washed to remove any soluble phosphate adhering thereto, and the water-washings may be either recycled to the digester or recombined with the substantially homogeneous MCP solution. The water-washed gangue may be disposed of or further processed to recover metal (e.g., Fe or Al) values, silicon values, fluorine values or other rock component values.

After the gangue separation, the substantially homogeneous MCP solution is sufficiently centrifuged to throw out and remove at least a portion of the radium particles from the solution. The radium particles can then be either collected as a separate product or be treated with or disposed separately or with the gangue. This centrifugation step may be carried out either continuously or in batch steps. Further, the centrifugation step may be carried out with one or more centrifugation apparatus (e.g., in parallel or sequential operations).

The treated MCP solution, after this centrifugation step, is then reacted according to any conventional method with sufficient sulfuric acid to form a phosphoric acid solution containing calcium sulfate. Substantially pure calcium sulfate can be then separated by any known means (e.g., filtration). By the usual control of the concentration and temperature conditions, the calcium sulfate product will be recovered as the dihydrate, hemihydrate or the anhydrite, as desired. The FIGURE shows this $H_2SO_4$ reaction and later separation steps occurring in one stage; however, it may be preferable in some instances (see the Examples below) to obtain two or more calcium sulfate products. In such instances, less than the stoichiometric amount of $H_2SO_4$ is added to the MCP solution in the first stage. Some formed calcium sulfate product is then separated from the MCP solution. Next, more $H_2SO_4$ is added to the MCP solution to form more calcium sulfate, which is then also separated. The separated calcium sulfate products may be combined or employed in separate products or uses. It has been found that calcium sulfate products made by a two-stage $H_2SO_4$ reaction sequence have different radium levels (see the Examples below). The calcium sulfate product of the later stage has a lower radium count than the former product. However, all calcium sulfate products prepared by this invention are characterized by a high degree of whiteness and contain relatively little chemical impurities which may make them attractive for use as construction items.

The phosphoric acid solution produced by this process is also suitable for a variety of uses. A portion of that solution, as shown in the FIGURE, is preferably recycled back to the digester. If a portion of the phosphoric acid product is recycled, it may be desirable to also recycle a sufficient portion of the substantially homogeneous MCP solution either before or after centrifugation, to neutralize any $SO_4$ ion content present in the phosphoric acid.

The following Examples further illustrate the present invention. All parts and percentages are by weight unless otherwise explicitly stated. All gamma counts were conducted with a Scintillation Spectrometer four (4) months after the samples were formed. This wait was necessary since the radioactivity of the samples increased slightly with time, reaching a final value after about three weeks of aging. It is believed that radioactive "daughter" (e.g., $Pb^{214}$ and $Bi^{214}$) compounds reach an equilibrium concentration at that time. The gamma results given are gross gamma results based on all gamma counts from 0.032 to 2.53 MEV.

EXAMPLE 1

This first example illustrates the typical amounts of radioactivity and the relative particle sizes of radioactive materials that can be found in MCP solutions which have not been treated by the present invention. A substantially homogeneous monocalcium phosphate solution (200 cc) was prepared by (1) digesting 70 BPL Florida phosphate rock with a phosphoric acid solution and (2) then removing the gangue by filtration through a 24 cm Buchner funnel containing No. 4 Whatman filter paper. This substantially homogeneous MCP solution was next filtered through several Metricel filters of various pore sizes. A screen analysis of the solids contained in the MCP solutions was thus obtained, and the separated fractions were each counted for gamma activity on a Gamma Scintillation Spectrometer. The results are tabulated below in Table 1.

TABLE 1

| Solids Present in MCP Solution and Their Radioactivity | | | | |
|---|---|---|---|---|
| Particle Size | Weight | Weight % | Activity | Total Activity |
| +5 microns | 0.7354 gm. | 85.2% | 575 pCi/gm | 423 pCi |
| −5 + 1.2 microns | 0.0253 | 2.9 | 3,393 | 86 |
| −1.2 + 0.8 microns | 0.0445 | 5.2 | 660 | 30 |
| −0.8 + 0.45 microns | 0.0268 | 3.1 | 1,540 | 41 |
| −0.45 + 0.2 microns | 0.0311 | 3.6 | 2,070 | 64 |
| | 0.8363 | 100.0 | | 644 |

Furthermore, the MCP solution which passed completely through the Metricel filters was converted into two phosphoric acid and gypsum batches. These gypsum batches were also counted for gamma activity, which counted 3.167 and 3.091 pCi/gm, respectively.

This 200 cc of MCP from which these solids were removed would have produced about 18 grams of gypsum if reacted with sufficient $H_2SO_4$. The 644 pCi of activity trapped on the Metricel filters would thus have given a gypsum with an activity of 644/18=35.8 pCi/gm. Thus, about 80–90% of the total activity in the MCP solution was in the form of particles larger than 0.2 microns.

EXAMPLES 2–5 AND COMPARISONS A AND B

A substantially homogeneous monocalcium phosphate solution similar to that of Example 1 was prepared Several batches (200 cc each) of this MCP solution were centrifuged at various speeds and times on a laboratory test tube centrifuge. The purpose of this operation was to throw down any small particulates including radium particles in the MCP solution.

The parameters of each test are given in Table II, below. Normally, the centrifuge took about 0.5 minute before reaching the desired speed and also took about 0.5 minute before stopping. About 0.25 cc of solid particulates were collected in the bottom of each test tube. The MCP solution was decanted from these solids after centrifugation was completed.

This MCP solution was then reacted with $H_2SO_4$ (3 cc per 200 cc MCP) while being stirred on a stir plate. The resulting mixture was allowed to set for about 10 minutes and gypsum was formed. The mixture was filtered over a 11 cc Buchner funnel fitted with No. 42 Whatman filter paper. The solid gypsum (First Batch Gypsum) was water-washed, extracted with acetone and air-dried. All steps were conducted at room temperature.

This filtered MCP solution was again reacted with the same proportion of $H_2SO_4$ (3 cc per 200 cc MCP) on a stir plate. The resulting mixture was again filtered on a Buchner funnel fitted with No. 42 Whatman filter paper to recover more gypsum (Second Batch Gypsum). This gypsum was also water-washed, extracted with acetone and air-dried.

The results of gamma counts on both the First and Second Batch Gypsums are given in Table II, below. The results of Examples 2–5 as compared to Comparisons A and B show that a major proportion of the radioactivity in the MCP can be removed by centrifugation and calcium sulfate (e.g., gypsum) products having acceptable levels of radioactivity can be made. It was determined separately that radium is a principal component of these radioactive solids.

Besides having the indicated levels of radioactivity, the two batches of gypsum made in each Example were strikingly clean and white, filtered very quickly and substantially met the chemical specifications for building materials like wallboard.

TABLE II

| Results of MCP Centrifuge Tests | | | | | |
|---|---|---|---|---|---|
| | | | Amount of Radioactivity, pCi/gm | | |
| Example | Centrifuge time, minutes | Centrifuge speed, g loading | First Batch | Second Batch | Two Batch Average |
| 2 | 2 | 150 | 27.5 | 3.7 | 15.6 |
| 3 | 2 | 625 | 18.1 | 6.8 | 12.4 |
| 4 | 2 | 1,135 | 10.4 | 3.2 | 6.8 |
| 5 | 10 | 1,135 | 11.0 | 5.3 | 8.1 |
| Comparison A | 0 | 1 | 48.2 | 7.7 | 27.9 |
| Comparison B | 0 | 1 | 47.5 | 7.1 | 27.3 |

EXAMPLE 6

The results of Examples 2–5 were checked by centrifuging one gallon of a substantially homogeneous MCP prepared similar to the preceding Examples. The speed of the centrifuge was 1,135 times gravity and the time was 10 minutes. The solids thrown were counted on a gamma counter and had an activity of 3,757 pCi/gm, showing that these thrown particles were indeed radioactive.

What is claimed is:

1. A process for simultaneously producing a phosphoric acid solution and a calcium sulfate product comprising:
   (a) digesting radium-containing phosphate rock with a solution comprising either phosphoric acid, monocalcium phosphate, or mixtures thereof, to form a resulting monocalcium phosphate solution containing undigested gangue material;
   (b) separating said gangue from said solution, thereby leaving a substantially homogeneous monocalcium phosphate containing radium impurities;
   (c) directly subjecting said substantially homogeneous monocalcium phosphate solution without additional processing to sufficient centrifugation in order to separate at least a portion of said radium from said solution;

(d) reacting said substantially homogeneous monocalcium phosphate solution with sufficient sulfuric acid to form a first monocalcium phosphate/phosphoric acid solution containing a first calcium sulfate product, the amount of said sulfuric acid being less than the stoichiometric amount necessary to react with the $Ca^{++}$ present in the monocalcium phosphate solution;

(e) separating the first monocalcium phosphate/phosphoric acid solution from said first calcium sulfate product;

(f) then reacting the separated first monocalcium phosphate/phosphoric acid solution with sufficient sulfuric acid to form a second monocalcium phosphate/phosphoric acid solution containing a second calcium sulfate product; and (g) separating the second monocalcium phosphate/phosphoric acid solution from said second calcium sulfate product, said separated second calcium sulfate product containing less than about 5 pCi/gm of radium.

2. The process of claim 1 wherein said centrifugation step is sufficient to remove at least a major portion of said radium from said monocalcium phosphate solution.

3. The process of claim 1 wherein said first and second calcium sulfate products are gypsum.

* * * * *